United States Patent Office 3,447,397
Patented June 3, 1969

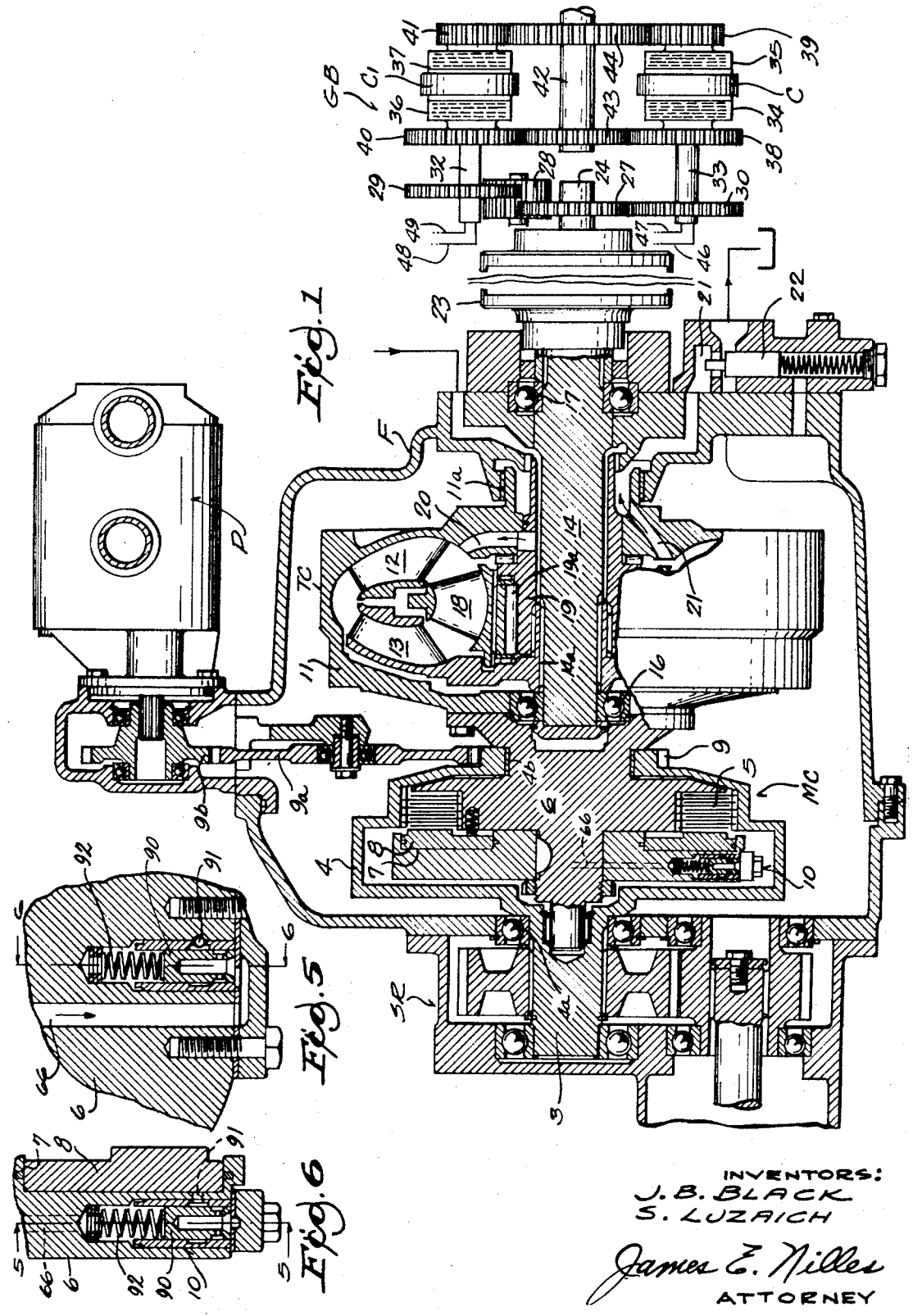

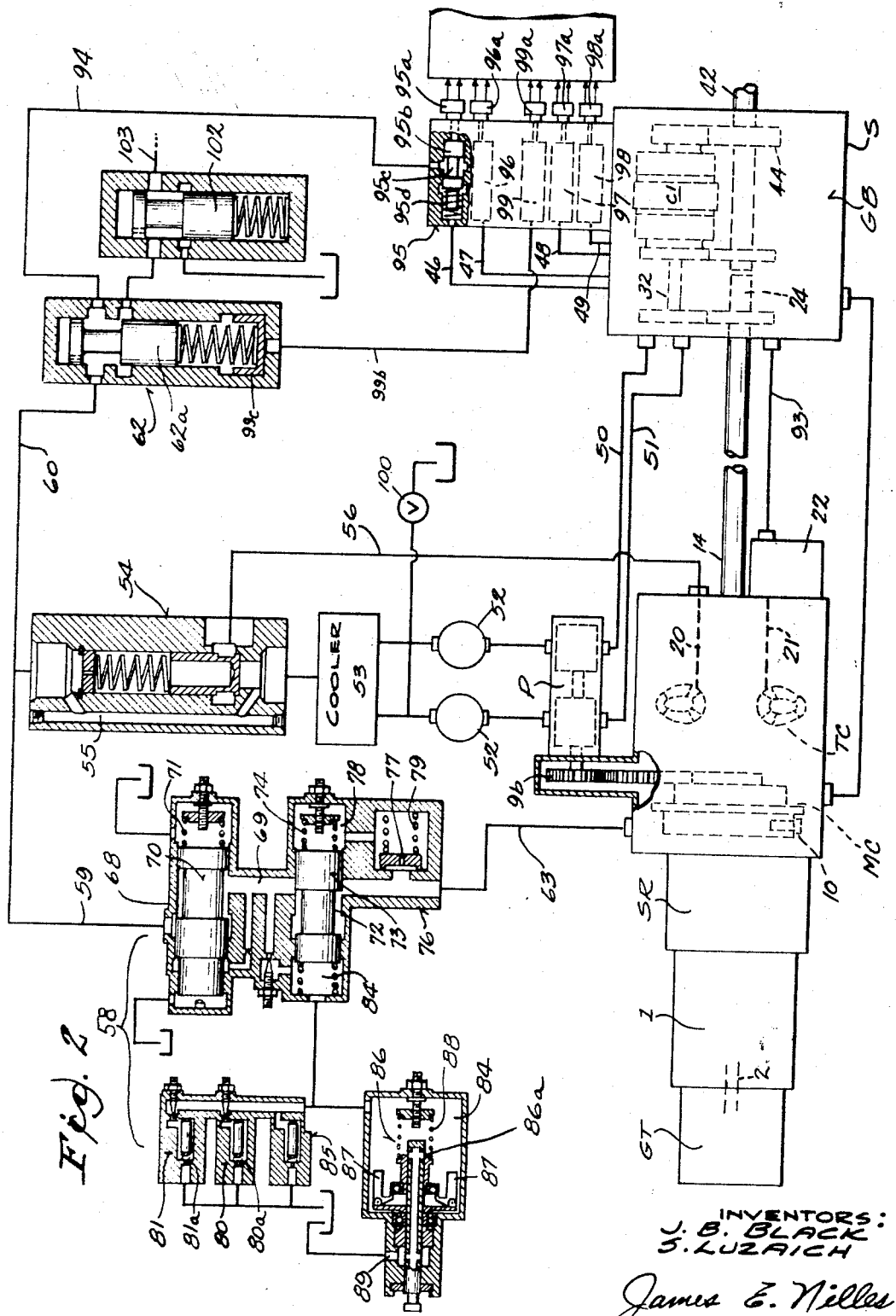

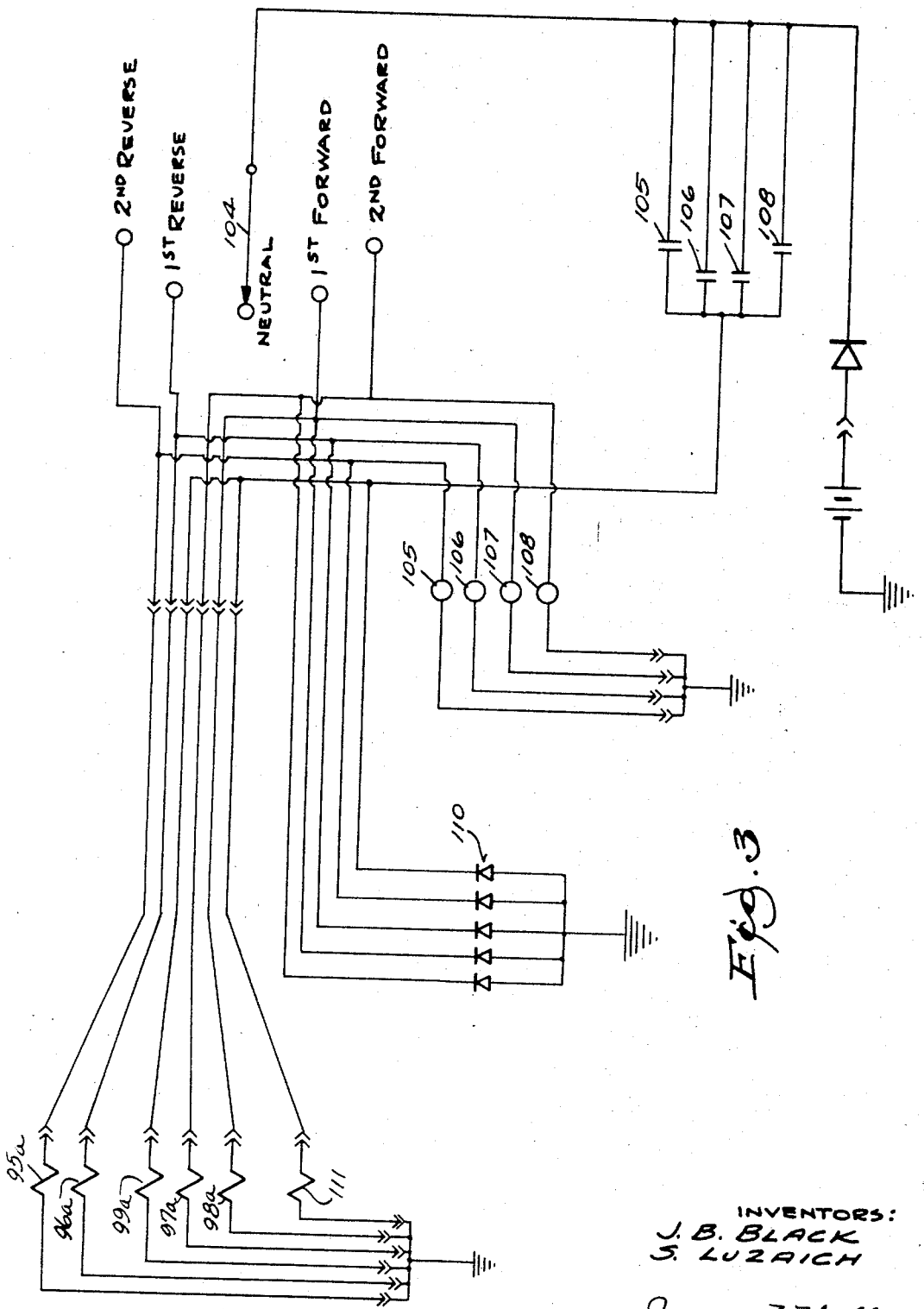

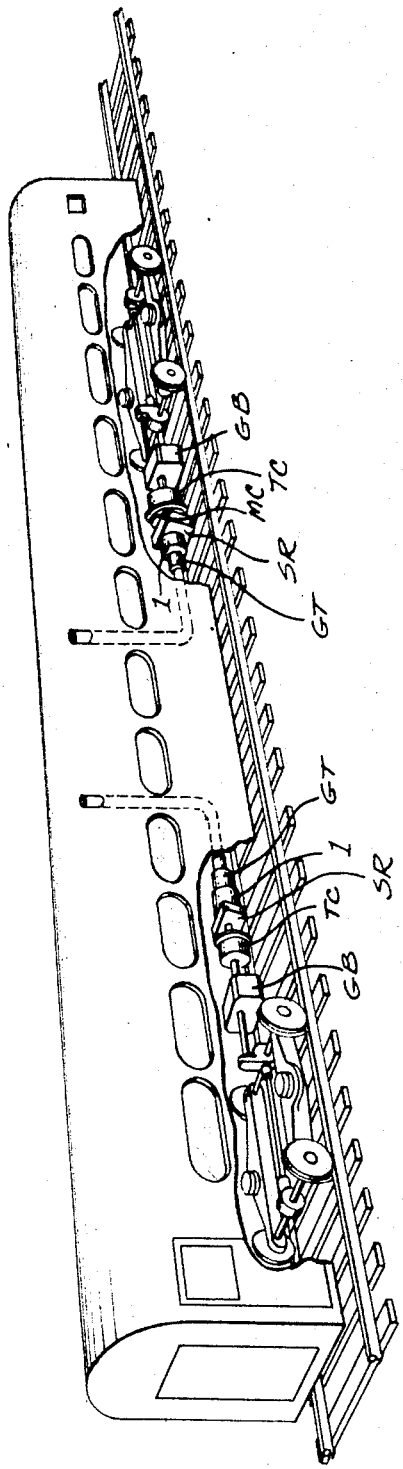

3,447,397
GEAR TRANSMISSION DRIVEN BY TORQUE CONVERTER AND CONSTANT SPEED CLUTCH
James B. Black, Roscoe, and Samuel Luzaich, Rockford, Ill., assignors to Twin Disc Incorporated, Racine, Wis., a corporation of Wisconsin
Filed Feb. 14, 1967, Ser. No. 615,983
Int. Cl. F16h 47/08
U.S. Cl. 74—732                  7 Claims

ABSTRACT OF THE DISCLOSURE

A variable ratio transmission controlled by fluid operated friction clutches and drivingly connected to a turbine by a constant speed and modulated fluid operated master clutch and by a torque convertor.

Background of the invention

Certain tyes of power sources operate best or most efficiently at a single predetermined speed. This has created certain problems and limitations in transmitting the output power of such single speed power sources to the load with the required speed variations and load characteristics. For example, the shaft of a single shaft gas turbine rotates only at one speed, commonly referred to as a "single spool" turbine, and it is imperative that this certain minimum speed be maintained in order to prevent exploding or surging of the turbine. As a result, the load on this type of power plant must be applied properly at all times to prevent pull down of the turbine speed. The shaft of a gas turbine operates at a very high speed and it has heretofore been proposed generally to achieve speed reduction to the load by means of gearing. Such an approach, however, requires heavy equipment, considerable maintenance and is costly to manufacture. Connecting a torque converter directly to the turbine results in high losses, cavitation, leakage and filling problems and high operating temperatures.

Gas turbines would lend themselves very well as a power source for certain types of power transmissions, such as for example, railway cars, where their torque characteristics, operating speeds and efficiencies are particularly desirable. In railway cars, at least two speed changes are required, and the shift from first to second speed must be made at high speeds, for example, at 50 miles per hour, and where passengers are standing and grasping overhanging straps, it is imperative that particularly smooth shifts be made at these speeds.

Nevertheless, the use for such purposes has heretofore been inhibited because of the lack of ability to harness and properly control this power, and smoothly shift gears at full speed and power.

Summar of the invention

Accordingly, the present invention provides a power transmission for a single speed power source, such as a gas turbine, which insures operation of the power source at its optimum condition, and results in a power output of great torque build up at the load, with good response and other operational characteristics and economy. A particularly smooth shift is provided at high speeds of the vehicle being driven so that the gear shift is unnoticeable.

More specifically, the transmission provided by the present invention includes a single speed gas turbine driving a torque converter through speed reducing gearing and a modulating clutch. A more specific aspect includes a modulating clutch of the constant output speed type.

Another aspect of the invention provides a hydraulic system for a transmission including a hydraulically operated modulating clutch and a plurality of individual gear selection clutches, in which system the clutches can all be sequenced relative to one another for smooth delivery of power at high speeds of the vehicle with which they are used.

These and other objects and advantages of the present invention will appear hereinafter as this disclosure progresses, reference being had to the accompanying drawings.

Brief description of the drawings

FIGURE 1 is a longitudinal, cross sectional view of a transmission embodying the present invention, certain parts being shown broken away, and the gear box shown schematically and "spread out" for clarity in the drawings;

FIGURE 2 is a schematic diagram of the various parts of the transmission shown in FIGURE 1, on a reduced scale;

FIGURE 3 is a schematic wiring diagram which may be used with the present invention;

FIGURE 4 is a perspective, generally schematic, view of a pair of transmissions made in accordance with the present invention, as applied to a railway car, certain portions of the latter shown as being broken away for clarity;

FIGURE 5 is a fragmentary view of the centrifugal valve shown in FIGURE 1, but on an enlarged scale, and FIGURE 6 is a view taken along line 6—6 in FIGURE 5.

Description of the preferred embodiment

Referring in greater detail to the drawings, the general arrangement of the transmission includes a power source such as a gas turibne GT which drives into its accessory gearbox 1 from which power is then delivered to a speed reducer SR. The power then flows into a modulated clutch MC and then to a torque converter TC. The torque converter in turn furnishes power to the gearbox GB which provides tow output speeds in either forward or reverse directions.

Gas turbine

The gas turbine GT is of a single speed type in which the output shaft 2 rotates at one, predetermined speed which is very high, such as on the order of 40,000 r.p.m. at full load or 41,300 r.p.m. at no load. The output speed of such a turbine cannot under load fall below a set minimum, such as the 40,000 r.p.m., or it will actually explode or be otherwise damaged. The rotational speed as it finally reaches the input shaft 3 of the modulating clutch MC may be reduced to a relatively low value of 2650, for example.

The torque output of such a turbine is relatively low, for example, on the order of 62 foot pounds. This torque when it finally reaches the load, such as the wheels of the vehicle, will have been greatly increased to perhaps 5000 foot pounds.

The accessory gearbox 1 and speed reducer SR are conventional and need no detailed description. It is believed sufficient to say that the output speed of the gearbox 1 may be about 4375 r.p.m. as delivered to the speed reducer SR.

The speed reducer SR then further reduces the speed to about 2650 r.p.m. and feeds power into the modulating clutch MC by rotating the clutch housing 4 (FIGURE 1).

Modulating clutch

The housing 4 is supported on bearings 4a and 4b and constitutes the input member of the clutch and can be variably engaged or clamped-up by the conventional interleaved friction plates 5 to the output member 6 of the clutch. The output member 6 defines a clutch actuating cylinder or expansible chamber 7 in which a piston 8 slides to abut against the clutch plates and urge them against the output member. Depending on the amount of pressurization of the fluid in chamber 7, the clutch plates will correspondingly clamp-up to provide a modulating action in transmitting power through the clutch. In other words, the clutch plates can be made to slip to any degree and thereby vary the power transmitted.

Certain parts, such as the housing 4 and output member 6, have been shown more or less schematically for clarity and in practice would be fabricated from several parts to facilitate manufacture and assembly.

A pinion 9 fixed on housing 4 drives a fluid, dual pump P through gears 9a and 9b. Pump P is the source of pressure fluid for supplying the hydraulic system.

The clutch MC is of the constant output speed type and for this purpose has regulating valve means 10 located on its output member 6 which insures a constant output speed, in accordance with the teachings in U.S. patent application Ser. No. 528,422 filed Feb. 18, 1966, entitled "Friction Clutch Having Centrifugally Operated Valve Means," which issued on Nov. 14, 1967 as Patent No. 3,352,395.

Torque converter

The torque converter TC has a housing 11 which is mounted on bearings 11a and 16 and is driven from the output member 6 of the modulating clutch. The housing 11 carries the impeller blades 12 which causes flow of fluid within the toroidal circuit of the converter and rotation of the turbine blades 13, thus driving the output shaft 14 to which they are splined at 14a. The output shaft 14 is rotatably mounted in the anti-friction bearing assemblies 16 and 17 which are mounted, respectively, in the housing 11 and housing F.

The converter also has stator blades 18 mounted on hub 19 through a one-way clutch 19a. Pressure fluid is introduced into a torque converter via the passages 20 and is taken from the converter by means of the passage 21, and through the converter regulator valve 22, to be described.

The end of the torque converter shaft 14 has a joint 23 by means of which it is connected to the input shaft 24 of the gearbox.

Gearbox

The change speed gearbox GB provides two speeds forward and two speeds in the reverse direction and utilizes duplex clutches C and C1 which may be of the type shown in the U.S. Patent 3,245,507 issued Apr. 12, 1966, and entitled "Hydraulically Operated Double Clutch Device."

The duplex clutch C includes its pair of individual, opposed, clutches 34 and 35 and duplex clutch C1 includes its pair of individual clutches 36 and 37. Each of the individual clutches 34, 35, 36 and 37 has its respective gears 38, 39, 40 and 41 associated therewith and these gears are rotable on their respective shafts. Actuation of a particular clutch by fluid pressure, as will appear, causes driving rotation of its associated gear.

The output shaft 42 has a pair of gears 43 and 44 fixed thereon, shaft 42 being connected to the load.

As previously mentioned there are two forward speeds and two speeds in reverse. Clutch C is the forward clutch while clutch C1 is the reverse clutch.

Gears 27 and 30 are in constant mesh and gears 27 and 28 are also in constant mesh with one another, as are gears 28 and 29.

Gears 38 and 40 are in constant mesh with gear 43. Gears 39 and 41 are in constant mesh with gear 44.

When a particular speed range is desired, the appropriate clutches are actuated, by means to be referred to later, so their associated gears are driven. The various speeds are obtained by the following gear selection. Forward low speed utilizes gears 27, 30, 39 and 44. Forward high speed utilizes gears 27, 30, 38 and 43. Reverse low speeds utilize gears 27, 28, 29, 41 and 44. Reverse high speed uses gears 27, 28, 29, 40 and 43.

The individual clutches are actuated by pressure fluid causing their pistons (not shown) to clamp up their respective clutch plates in the known manner, as described in the said U.S. Patent 3,245,507. The pressure fluid is introduced to the clutches 34, 35, 56 and 37 by, respectively, conduits 46, 47, 48 and 49 (FIGURES 1 and 2) which are in communication with conventional passages (not shown) in the clutch shafts 32 and 33.

The sequence of events in a gearbox shift generally is that the clutch pack engages at a low pressure, say 40 p.s.i., and after a timed delay, the pack pressure goes to its full pressure of from 160 to 200 p.s.i.

Hydraulic circuit

FIGURE 2 illustrates the hydraulic circuit. As previously mentioned, the dual pump P draws fluid via lines 50 and 51, from the sump S at the bottom of the gearbox and forces it under pressure through the filters 52, the heat exchanger 53 and to the flow divider valve 54.

An open passage 55 in the flow divider valve insures some fluid flow at all times to insure full lines. The divider valve splits the flow to the torque converter TC via line 56 and passage 20, to the modulating valve 58 via conduit 59, and via conduit 60 to the main regulator valve 62.

The modulating valve 58 can accurately vary the pressure of the fluid delivered via conduit 63 to the modulating clutch MC, more particularly to passage 66 (FIGURE 5) in member 6 that communicates with valve 10. As will appear, this varies the torque transmitting capacity of the clutch MC. The operation of the modulating valve 58 is as follows.

The valve 58 includes a differential area pressure regulator 68 which receives pressure fluid from the pump via conduit 59 and delivers it via passage 69 at a regulated pressure depending on the position of its spool 70 as determined by the bias of the adjustable spring 71.

The fluid is then fed in a throttling manner into annular groove 72 of a spool 73 which is biased to the left by adjustable spring 74. When the spool 73 shifts to the right (as viewed in the drawing), the pressure to the modulated clutch increases, and spool movement in that direction must be slow. This provides a controlled rate-of-rise of pressure to the clutch MC, as will appear. A rate control valve 76 has a throttling orifice 77 which prevents rapid dumping of fluid from chamber 78 at the end of spool 73. That is to say, when the operator (as will appear) causes spool 73 to shift to the right, orifice 77 restricts the flow from chamber 78 to conduit 63.

Solenoid valves 80 and 81 are actuated by the operator to cause shifting of spool 73 and consequent varied engagement of the clutch MC as follows. When the operator causes energization of the electrical coil of valve 80, by a control lever (not shown), the orifice 80a is closed causing a certain amount of fluid pressure build up in chamber 84 behind spool 73, pushes spool 73 to the right, that is, the clutch engaged positions. If the operator energizes the coil of solenoid valve 81, orifice 81a closes and causes pressure in chamber 84 and shifting of spool 73 to permit more fluid to go to the clutch. Orifices 80a and 81a are of different size so as to give different pressure rises in chamber 84. A third pressure rise is obtained when both input signal solenoid valves are closed by the operator.

A third solenoid valve 85 opens under overload conditions and dumps the system.

Valve 58 also includes an engine protector, or modulated clutch override, in the form of flyweight actuated governor valve 86. When in normal operating speed, the weights 87 keep valve 86 shut and pressure is thereby maintained in chamber 84. If, however, the engine lugs down in speed, the weights move radially inward, permitting spring 88 to open valve 86 and the fluid pressure to dump via orifice 86a to port 89.

Referring again to the centrifugal valve 10 which receives the pressure fluid from valve 58 via conduit 63, the piston 90 (FIGURE 1) is urged by centrifugal force in an outward radial direction and when the clutch is above a predetermined speed, the piston blocks port 91 and thus prevents fluid from entering the clutch actuating chamber 7. As a result, the friction clutch plates 5 are engaged with less clamp up force and speed loss eventually results. If sufficient pressure fluid is delivered to the valve 10 by valve 58, as called for by the operator, the centrifugal force acting on the piston will be overcome, as will the bias of spring 92 and the port 91 will be opened to permit additional clamp up of the clutch MC. The bias of spring 92 is sufficient to hold port 91 shut when the clutch is at idle.

With the above hydraulic arrangement, the modulating clutch is variably engaged with the controlled pressure rise valve 58 feeding the centrifugal valve 10 to provide a clutch having a constant output speed.

Turning again to the hydraulic circuit of the torque converter, as mentioned, the flow divider valve furnishes pressure fluid via conduit 56 and passage 20 to the toroidal path in the converter, and fluid leaves the converter via passage 21 and then out through the regulator valve 22. Valve 22 functions to maintain a certain pressure in the converter by regulating the flow from the converter to the sump via conduit 93.

Referring again to the hydraulic circuit for the gearbox clutches C and C1, pressure fluid is directed by the flow divider valve 54 via conduit 60 and to the main regulator valve 62. Pressure fluid flows via conduit 94 to the four solenoid operated, speed selector valves 95, 96, 97 and 98 of the clutches 34, 35, 36 and 37, respectively. As the valves 95–98 are similar, it is believed sufficient to briefly describe one. For example, valve 95 includes a spool 95b which has an annular groove 95c intermediate its length, which groove permits the flow of fluid to the clutch 34 when the corresponding solenoid 95a is energized, thus shifting the spool to the left (as viewed in the drawings) against the normally closing biasing action of spring 95d. In other words, fluid is diverted to the appropriate clutch, when the corresponding solenoids 95a, 96a, 97a and 98a of the selector valves are energized.

A rate of rise valve 99, actuated by solenoid 99a, varies the pressure acting on spool 62a, via conduit 99b leading to piston 99c.

A by-pass valve 100 acts to by-pass oil to sump thereby reducing hydraulic pump load and viscous plate drag to facilitate gas turbine starting.

A conventional lubrication regulator valve 102 provides pressure fluid via conduit 103 to conventional lubricating passages (not shown) in the various parts of the transmission.

Electric circuit

The solenoids are electrically actuated when the control handle 104 selects any one of the two forward or two reverse ratios and thus energizes the appropriate solenoids.

The coils and contacts of the time delay relays 105, 106, 107, and 108 energize solenoids 111 and 99a, after the appropriate clutch solenoids 95a, 96a, 97a, and 98 have been energized and the clutch packs are fully engaged at low pressure. The diode assembly designated at 110 provide for arc suppression of the signals in the various conductors. Solenoid valve 111 is for a clearance signal for other circuits (not shown) of the vehicle and it signals that everything is in working order in the above system, so that other systems on the vehicle can be phased in.

Résumé

The single speed gas turbine power source is prevented from pulling down below its predetermined optimum operating speed and the load is properly applied through the present transmission which can deliver a great torque build up at the load with good response and efficiency and with a smooth delivery of power. The constant output speed modulating clutch maintains the output shaft at a certain speed in combination with the gas turbine.

The invention finds particular utility when two transmissions are used on a railcar where smooth shifting is required at high speeds. The sequence for shifting the two transmissions in a car such as shown in FIGURE 4 is as follows:

Assume both transmissions are in operation driving the car in low gear at 50 m.p.h. for example, and it is desired to shift both of them to a higher gear ratio for greater speeds. In a commuter car, for example, this must be done in such a manner that minimum shock or other jolt is felt by the passengers. Also, the shift should be smooth to save wear and tear on the equipment.

One of the transmissions is shifted first say at 50 m.p.h. and then the other is shifted shortly thereafter at say 55 m.p.h.

The modulating clutch MC of the first transmission would be disengaged and the high speed gear clutch would be engaged at a reduced fluid pressure (and therefore at a reduced torque transmitting capacity) which reduces the peak energy in the clutch. By engaging the speed change clutch at a reduced pressure and torque, the life of the clutch is extended and minimum discomfort occurs to the passengers. After the high speed clutch is thus engaged, the pressure is then raised in order that the full torque can be transmitted through it. The modulating clutch MC is then again engaged fully by action of the pressure rise valve 58. With this sequence, the speed clutch is fully engaged before the modulating clutch MC is engaged.

After this shift of the first transmission, the second transmission is shifted similarly, thus again driving the car with both transmissions at high gear.

Various modes of carrying out the invention are contemplated as being within the scope of the following claims particularly pointing out and distinctly claiming the subject matter which is regarded as the invention.

We claim:

1. A power transmission comprising a single speed gas turbine as a source of power, speed reducer means driven by said turbine, a hydraulically actuated and modulating friction plate clutch driven by said speed reducer means, said modulating clutch being of the constant output speed type, a hydraulic torque converter connected to said clutch for receiving power directly therefrom, change speed gear means driven by said torque converter and including a plurality of hydraulically actuated clutches for gear selection, and hydraulic circuit means for controlling pressure fluid to said modulating clutch, said torque converter and said gear means, and a solenoid operated selector valve in said circuit means for each of said gear selection clutches for controlling admission of pressure fluid thereto and consequent engagement thereof.

2. A transmission as defined in claim 1 further characterized in that said modulating clutch has a centrifugal valve on its output member and in said circuit means for controlling the flow of pressure fluid to the friction plates of said modulating clutch for maintaining the output speed of the modulating clutch constant.

3. A transmission as set forth in claim 2 wherein said modulating valve comprises a shiftable fluid throttling spool for modulating the flow of fluid to the modulating clutch, a differential area pressure regulator for directing pressure fluid at an adjusted value to said spool, a plurality of selectively operated solenoid valves for adjusting the pressure on said spool and consequently the fluid throttling position thereof, and a rate control valve for controlling the speed of movement of said spool in a clutch apply direction.

4. A transmission as set forth in claim 3 wherein said change speed gear means includes a plurality of hydraulically actuated friction clutches each having an associated gear for disengageable driving relationship therewith when its clutch is pressurized.

5. A hydraulic system for a power transmission having a hydraulic torque converter, a plurality of hydraulically actuated friction clutches for gear selection, and a hydraulically actuated modulating friction clutch for driving said converter, said system including a modulating valve for directing pressure fluid to said modulating clutch, said modulating valve including a shiftable fluid throttling spool for modulating the flow of fluid to the modulating clutch, a differential area pressure regulator for directing pressure fluid at an adjusted valve to said spool, a plurality of selectively operated solenoid valves for adjusting the pressure on said spool and consequently the fluid throttling position thereof, and a rate control valve for controlling the speed of movement of said spool in a clutch apply direction; a plurality of solenoid operated selector valves, one for each gear selection friction clutch for causing selective engagement thereof and consequent desired gear ratio; a pressure regulator valve for varying the pressure of the fluid directed to said selector valves, and a source of pressure fluid for said modulating valve, said converter and said selector valves.

6. The system as set forth in claim 5 further characterized in that a centrifugally operated valve is mounted in the output member of said modulating clutch for controlling engagement thereof, and said modulating valve directs modulated pressure fluid to said centrifugally operated valve.

7. A power transmission comprising a single speed gas turbine as a source of power, speed reducer means driven by said turbine, a hydraulically actuated and modulating friction plate clutch driven by said speed reducer means, a hydraulic torque converter connected to said clutch for receiving power directly therefrom, change speed gear means driven by said torque converter; hydraulic circuit means for controlling pressure fluid to said modulating clutch, said torque converter and said gear means; a modulating valve in said circuit means for directing pressure fluid to said modulating clutch, said modulating valve comprising a shiftable fluid throttling spool for modulating the flow of fluid to the modulating clutch, a differential area pressure regulator for directing pressure fluid at an adjusted valve to said spool, a plurality of selectively operated solenoid valves for adjusting the pressure on said spool and consequently the fluid throttling position thereof, and a rate control valve for controlling the speed of movement of said spool in a clutch apply direction.

References Cited
UNITED STATES PATENTS

| | | |
|---|---|---|
| 2,297,480 | 9/1942 | Kratzmann. |
| 2,773,572 | 12/1956 | Province. |
| 3,005,529 | 10/1961 | Bochman. |
| 3,202,018 | 8/1965 | Hilpert _____ 74—732 |
| 3,293,944 | 12/1966 | Hilpert. |
| 3,322,247 | 5/1967 | Luziach. |
| 3,329,066 | 6/1967 | Murphy _____ 74—732 |

BENJAMIN W. WYCHE, III, *Primary Examiner.*

U.S. Cl. X.R.

105—130; 192—3.5, 56, 104, 105, 109